Figure 1:
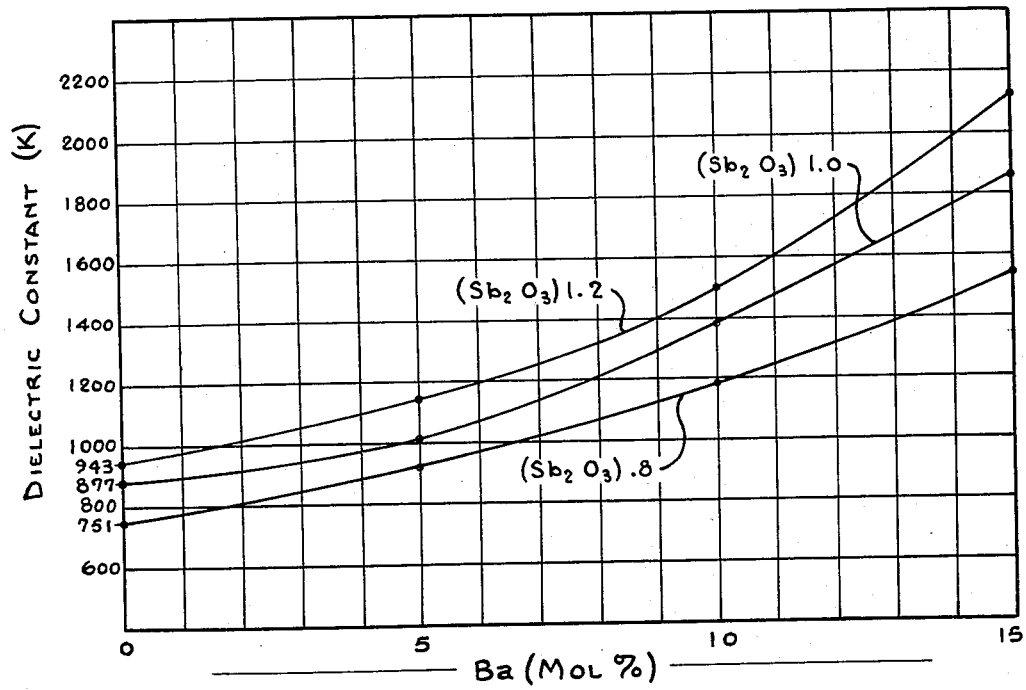

INVENTORS
ROLLAND R. ROUP
HAROLD R. LAIRD
HOWARD U. TAYLOR
BY John W. Michael
ATTORNEY

United States Patent Office 3,117,094
Patented Jan. 7, 1964

3,117,094
LEAD TITANATE ZIRCONATE CERAMIC COMPOSITION WITH ADDITIVES
Rolland R. Roup and Harold R. Laird, Milwaukee, and Howard U. Taylor, Thiensville, Wis., assignors to Globe-Union Inc., Milwaukee, Wis., a corporation of Delaware
Filed Dec. 19, 1960, Ser. No. 76,842
10 Claims. (Cl. 252—62.9)

This invention relates to a modified lead titanate zirconate ceramic composition wherein small amounts of antimony and/or bismuth are included with the standard lead titanate zirconate composition or with such a composition in which part of the lead is replaced with barium to provide a composition which after firing and polarization has better electromechanical coupling as compared with unmodified lead titanate zirconate ceramics and is further characterized by stability, easily controlled relatively high dielectric constant, ability to be properly fired over a wide firing range, and a Curie point which permits practical use on a wide range of piezo-electric applications.

The object of this invention is to provide such a ceramic composition which is better in its piezo-electric properties as compared with lead titanate zirconate ceramic.

A second object is to provide such a ceramic composition which has those piezo-electric properties in a wide range of dielectric constants.

Electromechanical coupling or coupling coefficient is herein designated as percent cc. and is a measure of the efficiency of transformation of electrical to mechanical energy or vice versa determined from the resonant and antiresonant frequencies (radial mode) by a bridge method and frequency meter. This electro-mechanical coupling is also known as radial coupling and is also expressed by the symbol $K_r$ in decimals.

Dielectric constant is herein designated as K and is measured at 1000 cycles by a standard impedance bridge (calculated from the capacity and physical dimensions).

Another measure herein designated $d_{33}$ is the electric charge produced by a unit of pressure determined by measuring the voltage produced by suddenly removing a calibrated weight from the polarized piece. In regard to units, $d_{33}$ is expressed in coulombs $\times 10^{-15}$ per dyne.

As is well known to those skilled in this art, the Curie point is the temperature at which a crystal change occurs and above which a defined piezo-electric polarized ceramic composition loses its polarization and its piezo-electric properties.

Standard lead titanate zirconate ceramics having ranges of composition on the basis of atom percentages suitable for piezo-electric application are well known and described in U.S. Patent No. 2,708,244. However, when polarized, they seldom exhibit a percent cc. in excess of 33, a $d_{33}$ in excess of 1.65 and a K above 1000. By adding small amounts by weight percent of antimony in the form of antimony tri-oxide ($Sb_2O_3$), say .8 to 1.2 wt. percent, or bismuth in the form of bismuth tri-oxide ($Bi_2O_3$), say 1.2 to 1.8 wt. percent, a very definite improvement in electrical properties and firing range is obtained. For example the percent cc. is increased about an average of 51% and the $d_{33}$ is increased approximately an average of 100% in the wide variety of compositions shown in the table of examples. For select compositions, gains in percent cc. are between 70 and 80% and gains in $d_{33}$ range up to about 130%. By also replacing up to about 15% atom percent of the lead with barium there is a slight increase in the percent cc. and the $d_{33}$, and the K can be advantageously controlled to a range of from 750 to about 2100.

For the purpose of establishing this invention and testing its compositional ranges the ceramic materials hereinafter described were prepared in accordance with well known ceramic procedures and made into discs of approximately one-half inch diameter to which were applied silver electrodes in the customary manner. The polarizing voltage was applied and then each disc was separately tested for the K, percent cc. and $d_{33}$.

The general empirical formula for the compositions below may be expressed:

$$Pb_A Ba_B (Zr_C Ti_D) O_3$$

wherein A, B, C, and D (subscripts) represents the atom percent of the respective component symbols with which each is associated and have the numerical values:

$A=1.00$ to $0.80$; $B=0$ to $0.20$; $C=0.40$ to $0.60$; $D=0.60$ to $0.40$; and $A+B=C+D=1.00$

Table of Examples

| Empirical Formula of Composition | K | Percent cc. | $d_{33}$ |
|---|---|---|---|
| $Pb(Zr_{.55}Ti_{.45})O_3 + 0.8$ weight percent of $Sb_2O_3$ | 751 | 56.6 | 3.14 |
| $Pb(Zr_{.55}Ti_{.45})O_3 + 1.0$ weight percent of $Sb_2O_3$ | 877 | 53.9 | 3.24 |
| $Pb(Zr_{.55}Ti_{.45})O_3 + 1.2$ weight percent of $Sb_2O_3$ | 945 | 51.2 | 3.15 |
| $Pb_{.95}Ba_{.05}(Zr_{.55}Ti_{.45})O_3 + 0.8$ weight percent of $Sb_2O_3$ | 925 | 58.6 | 2.94 |
| $Pb_{.95}Ba_{.05}(Zr_{.55}Ti_{.45})O_3 + 1.0$ weight percent of $Sb_2O_3$ | 1,014 | 56.9 | 2.80 |
| $Pb_{.95}Ba_{.05}(Zr_{.55}Ti_{.45})O_3 + 1.2$ weight percent of $Sb_2O_3$ | 1,135 | 53.8 | 3.26 |
| $Pb_{.90}Ba_{.10}(Zr_{.55}Ti_{.45})O_3 + 0.8$ weight percent of $Sb_2O_3$ | 1,187 | 59.2 | 3.04 |
| $Pb_{.90}Ba_{.10}(Zr_{.55}Ti_{.45})O_3 + 1.0$ weight percent of $Sb_2O_3$ | 1,380 | 58.8 | 3.02 |
| $Pb_{.90}Ba_{.10}(Zr_{.55}Ti_{.45})O_3 + 1.2$ weight percent of $Sb_2O_3$ | 1,500 | 57.7 | 3.56 |
| $Pb_{.85}Ba_{.15}(Zr_{.55}Ti_{.45})O_3 + 0.8$ weight percent of $Sb_2O_3$ | 1,540 | 57.4 | 3.69 |
| $Pb_{.85}Ba_{.15}(Zr_{.55}Ti_{.45})O_3 + 1.0$ weight percent of $Sb_2O_3$ | 1,860 | 57.7 | 3.36 |
| $Pb_{.85}Ba_{.15}(Zr_{.55}Ti_{.45})O_3 + 1.2$ weight percent of $Sb_2O_3$ | 2,120 | 51.7 | 3.37 |
| $Pb(Zr_{.55}Ti_{.45})O_3 + 1.2$ weight percent of $Bi_2O_3$ | 805 | 49.5 | 3.75 |
| $Pb(Zr_{.55}Ti_{.45})O_3 + 1.5$ weight percent of $Bi_2O_3$ | 825 | 47.3 | 3.33 |
| $Pb(Zr_{.55}Ti_{.45})O_3 + 1.8$ weight percent of $Bi_2O_3$ | 860 | 46.6 | 3.09 |
| $Pb_{.95}Ba_{.05}(Zr_{.55}Ti_{.45})O_3 + 1.2$ weight percent of $Bi_2O_3$ | 876 | 51.4 | 3.84 |
| $Pb_{.95}Ba_{.05}(Zr_{.55}Ti_{.45})O_3 + 1.5$ weight percent of $Bi_2O_3$ | 924 | 49.3 | 3.47 |
| $Pb_{.95}Ba_{.05}(Zr_{.55}Ti_{.45})O_3 + 1.8$ weight percent of $Bi_2O_3$ | 915 | 45.1 | 2.50 |
| $Pb_{.90}Ba_{.10}(Zr_{.55}Ti_{.45})O_3 + 1.2$ weight percent of $Bi_2O_3$ | 1,048 | 51.3 | 2.95 |
| $Pb_{.90}Ba_{.10}(Zr_{.55}Ti_{.45})O_3 + 1.5$ weight percent of $Bi_2O_3$ | 1,062 | 48.7 | 3.39 |
| $Pb_{.90}Ba_{.10}(Zr_{.55}Ti_{.45})O_3 + 1.8$ weight percent of $Bi_2O_3$ | 1,097 | 49.9 | 3.39 |
| $Pb_{.85}Ba_{.15}(Zr_{.55}Ti_{.45})O_3 + 1.2$ weight percent of $Bi_2O_3$ | 1,348 | 53.4 | 3.48 |
| $Pb_{.85}Ba_{.15}(Zr_{.55}Ti_{.45})O_3 + 1.5$ weight percent of $Bi_2O_3$ | 1,430 | 50.7 | 3.36 |
| $Pb_{.85}Ba_{.15}(Zr_{.55}Ti_{.45})O_3 + 1.8$ weight percent of $Bi_2O_3$ | 1,485 | 49.2 | 3.37 |

Figure 2:
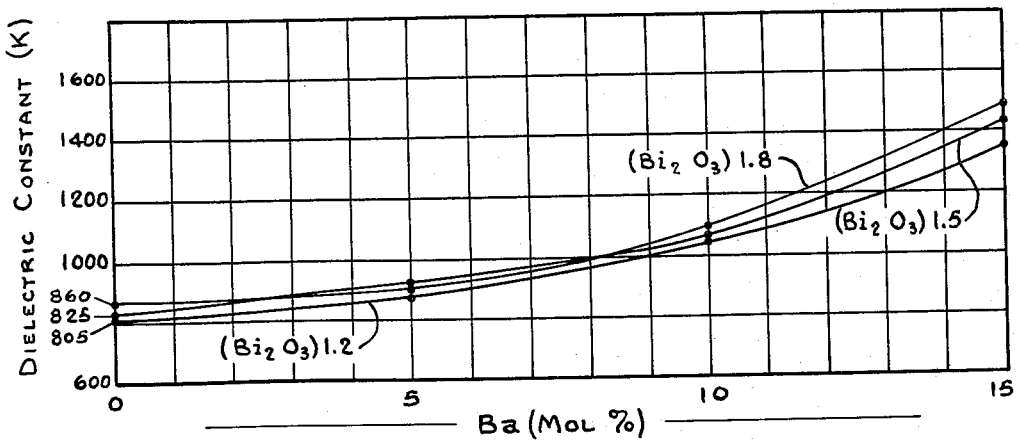

From an inspection of the foregoing examples it is seen that percent cc. and $d_{33}$ are relatively uniform and of sufficiently high values to produce a piezo-electric piece having a wide range of practical applications. Within the compositional areas of principal interest to this invention the values of K after polarization increase both with the quantity of $Sb_2O_3$ or $Bi_2O_3$ (the latter to a lesser extent) and with the quantity of Ba replacing the Pb. When K is plotted against Ba for each wt. percent of the $Sb_2O_3$ or $Bi_2O_3$ the separate curves are spaced with the curve for the highest wt. percent starting higher and rising rather steeply with the increase in Ba. FIGS. 1 and 2 are graphic representations of the changes in K resulting from changes in quantity of Ba replacing the Pb. FIG. 1 shows the effect of also changing the quantity of $Sb_2O_3$ and FIG. 2 shows the effect of also changing the quantity of $Bi_2O_3$. In fact, by proper proportioning of the weight percent of these compositional variables the K can be controlled easily from 750 to 2100 with little change in the piezo constants. The power factor, after polarization of these examples, is under 3.00, a commercially acceptable power factor.

The preferred method of preparing the basic compositions entails the use of lead oxide (PbO), zirconia (ZrO$_2$), titania (TiO$_2$), barium carbonate (BaCO$_3$ and the antimony tri-oxide (Sb$_2$O$_3$) or bismuth tri-oxide (Bi$_2$O$_3$). The materials are weighed out, milled wet, filtered and dried. The composition is calcined in open saggers at about 1550° F. for two hours. It is then advisable to remill to a fine particle size, filter and dry. The usual binders are added and the piece fabricated (extrude, mold, pellet, etc.). The binders are then removed by firing the pieces in open settings at 1200° F. to 1400° F. for one-half hour. Subsequently this material is fired to maturation in tightly sealed refractories, generally with a cup of lead oxide to provide a lead oxide atmosphere to thus prevent loss of weight due to volatilization of lead oxide.

The fired pieces are lapped to provide smooth parallel surfaces. The electrodes are then applied to these surfaces in the manner known to those skilled in this art.

The pieces are then polarized in an oil bath with a D.C. polarizing voltage.

While there have been described what are now considered preferred embodiments, various changes and modifications will become apparent to those skilled in the art without departing from the invention as set forth in the appended claims.

We claim:

1. A ceramic composition capable when fired and polarized by exhibiting piezo-electric characteristics consisting of lead titanate and lead zirconate in mol ratios of from 60:40 to 40:60 respectively and containing from about 0.5% to 4.0% by weight in the aggregate of bismuth oxide.

2. A ceramic composition capable when fired and polarized of exhibiting piezo-electric characteristics consisting of lead titanate and lead zirconate in mol ratios of from 60:40 to 40:60 respectively and containing from about 0.5% to 3.0% by weight in the aggregate of antimony oxide.

3. A ceramic composition capable when fired and polarized of exhibiting piezo-electric characteristics consisting of lead titanate and lead zirconate in mol ratios of from 60:40 to 40:60 respectively in which about 0 to 20 atom percent of the lead in the lead titanate and lead zirconate is replaced by barium and which contains from about 0.5% to 3.0% by weight of bismuth oxide.

4. A ceramic composition capable when fired and polarized of exhibiting piezo-electric characteristics consisting of lead titanate and lead zirconate in mol ratios of from 60:40 to 40:60 respectively in which about 0 to 20 atom percent of the lead in the lead titanate and lead zirconate is replaced by barium and which contains from about 0.5% to 2.0% by weight in the aggregate of antimony oxide.

5. A ceramic composition having the general empirical formula hereinafter set forth, where A, B, C, and D represent the atomic percent of the respective component symbols, $$Pb_A Ba_B (Zr_C Ti_D) O_3$$

where A is from 1.00 to 0.80, B is from 0 to 0.20, C is from 0.40 to 0.60, and D is from 0.60 to 0.40, with the addition of from 0.8% to 1.2% by weight of Sb$_2$O$_3$.

6. A ceramic composition having the general empirical formula hereinafter set forth, where A, B, C, and D represents the atomic percent of the respective component symbols, $$Pb_A Ba_B (Zr_C Ti_D) O_3$$

where A is from 1.00 to 0.80, B is from 0 to 0.20, C is from 0.40 to 0.60, and D is from 0.60 to 0.40, with the addition from 1.2% to 1.8% by weight of Bi$_2$O$_3$.

7. A piezo-electric piece formed of lead titanate and lead zirconate in the mol ratios of from 60:40 to 40:60 respectively and antimony oxide by weight in the aggregate of from about .8% to about 1.2% fired to maturity and polarized and having a dielectric constant of over 700, a coupling coefficient of over 51, and an electric charge of about 2.7 to about 3.7.

8. A piezo-electric piece according to claim 7 in which about 0 to 15 atom percent of the lead in the lead titanate is replaced by barium and the dielectric constant is from about 750 to about 2120.

9. A piezo-electric piece formed of lead titanate and lead zirconate in the mol ratios of from 60:40 to 40:60 respectively and bismuth oxide by weight in the aggregate of from about 1.2% to about 1.8% fired to maturity and polarized and having a dielectric constant of over 805, a coupling coefficient of over 45, and an electric charge of about 2.5 to about 3.8.

10. A piezo-electric piece according to claim 9 in which about 0 to 15 atom percent of the lead in the lead titanate is replaced by barium and the dielectric constant is from about 805 to about 1485.

References Cited in the file of this patent

UNITED STATES PATENTS

| | | |
|---|---|---|
| 2,708,244 | Jaffe | May 10, 1955 |
| 2,777,773 | Callahan | Jan. 15, 1957 |

OTHER REFERENCES

Megaw: Ferroelectricity in Crystals, Methuen, London, 1957, pages 114–121. (Copy in Sci. Lib.)